LOOP SUPERVISION CIRCUITRY

Filed June 7, 1966

4 Sheets-Sheet 1

LOOP SUPERVISION CIRCUITRY

United States Patent Office 3,525,816

Patented Aug. 25, 1970

3,525,816
LOOP SUPERVISION CIRCUITRY

Eberhard Herter, Stuttgart, Germany, assignor to International Standard Electric Corporation, New York, N.Y., a corporation of Delaware Filed June 7, 1966, Ser. No. 555,913
Claims priority, application Germany, June 19, 1965, St 24,001
Int. Cl. H04m 3/22
U.S. Cl. 179—18 5 Claims

ABSTRACT OF THE DISCLOSURE

A loop supervision circuit for supervising loop conditions and for discerning loop resistances of telephone lines. The system is particularly useful in telephone lines using direct current signalling. The circuitry includes a linear symmetrical bridge connected to include the feeder resistors and further connected so that interfering noises on lines are cancelled out and thereby never reach the evaluating device. Similarly, battery voltage fluctuations are also kept from the evaluating device by the connection of the bridge.

The invention relates to loop supervision circuitry and more particularly to circuit arrangements for detecting the loop condition and for discerning loop resistances, especially in case of D.C. signalling via a D.C. fed telecommunication or telephone line.

In direct current key dialling systems the signalling may be accomplished by changes of the loop current which means that in the transmitting device the line loop is terminated with a resistor chosen from a plurality of resistors to correspond to the signal to be formed. In other dialling methods a change of the loop current is used, i.e., a change of the loop resistance, for example acts as a pre-signal. The receiving circuit arrangement then determines which of a plurality of resistances is effective.

During the actual evaluation measurements the current to be measured not only depends on the terminating resistance at the transmitting end of the line, but also on induced interfering voltages, the leak resistances, the fluctuations of the battery voltage, etc.

The actual value of the loop terminating resistance on the transmitting end is therefore detected on the receiving end of the line, as a value which fluctuates within a certain range, depending on the aforementioned influences. For a practical evaluation of the instantaneous value when more than one resistance is used, it is necessary that the ranges of the measuring magnitudes do not overlap but are separated by an intermediate space.

It is conventional to provide a comparing magnitude in the evaluating circuit. The comparing magnitude is called threshold value in the following description. The threshold value is located between the ranges of the measuring magnitude. The evaluating facility or circuit determines whether the measuring magnitude is within a range above or below the threshold value.

The evaluating circuit must be relatively independent of interferences and tolerances of the line elements and must protect the evaluating means used against excessive voltages (e.g., lightnings).

The evaluating circuit arrangements hitherto known are essentially asymmetric receiving circuits; the few symmetrical receiving circuits are either very expensive or show essential disadvantages, as for example the symmetrical relay circuits. In the asymmetrical receiving or evaluating circuits the voltage drop, caused by the current at the respective feeder resistance, is compared with a correspondingly selected portion of the battery voltage for evaluation purposes.

The disadvantages of the asymmetrical receiving circuits are that the longitudinal interfering current, caused by the induced longitudinal interfering voltage applied via the wire-ground-capacitance is completely included in the measuring result.

The well known relay evaluating circuits excel on the one hand in that the operating range is practically unlimited, because almost no protection is required against short-time excessive voltages and in that they provide a complete potential separation between the loop to be supervised, the input circuit and the evaluation means in the output circuit. But, on the other hand, the following disadvantages must be taken into consideration. Due to the immense temperature dependence of the winding resistance of the relay coils the evaluation is rather unreliable. If several measuring ranges are provided several different relay winding types must be used for the corresponding threshold values. Another drawback with relay circuitry is the limited switching speed of the relays.

The circuit arrangement according to the invention shows the advantages that the indication of the evaluating device is independent of symmetrical interferences, i.e., independent of the magnitude of the longitudinal voltage and its phase position; that each threshold value can be set, and that the evaluation is made with sufficient speed.

This is achieved according to the invention in that an evaluating device such as a solid state switch, or differential amplifier can be connected with the line terminals through at least one auxiliary potential difference source. The sum voltage of the auxiliary sources is directed oppositely to the feeder or supply voltage, and the auxiliary voltages are selected so that, when the value being evaluated equals the threshold value of the loop resistance, then a bridge-type circuit at the terminals of the evaluating device is balanced. (Potential difference preferably zero.)

The evaluating circuit is widely independent of fluctuations of the battery voltage according to the invention, because the potentials at the terminals of the evaluating device are each derived from a separate voltage divider, one voltage divider is connected with its second resistor to the negative pole of the supply source and with the first resistor to the positive terminal of the supply source; the other voltage divider is connected with its second resistor to the positive pole of the supply source and with its first resistor to the negative terminal of the supply source.

Protection from excessive voltages is achieved, according to the invention, because of the high resistance value of the voltage divider resistors. This measure shows another advantage, namely that the voltage deviation at the terminals of the evaluating device increases.

The evaluating device is simplified with the symmetrical evaluating circuit if it is not necessary to indicate the loop condition continuously. If it is sufficient to determine once during a prescribed time interval the instantaneous loop condition a diode is used as the evaluating means. The diode is simultaneously a part of a scanning circuit, fed with alternating current or pulses, whereby in each feeder line of the A.C. circuit for the diode a capacitor is inserted. This arrangement provides, according to the invention, another reduction in expenditure in that the reading facility of the scanning circuit is associated to severals loops that are supervised in timely sequence.

The abovementioned and other and further objects of the invention will become more apparent as the description proceeds, when taken in conjunction with the drawings, in which.

Figure 1:
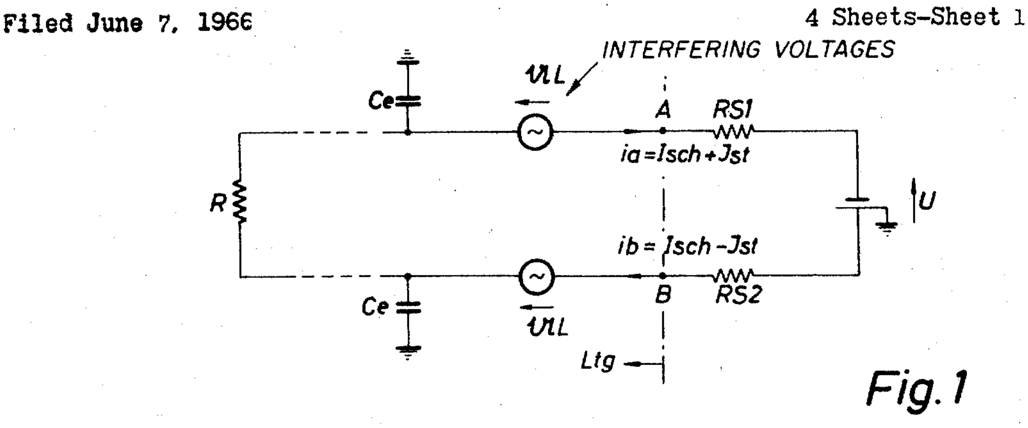
FIG. 1 shows a D.C. fed loop.

FIG. 1 shows a line loop with two wires. The receiving station is shown equipped with a supply source U, the resistors RS1 and RS2, the grounded capacitors C*e* and the loop resistor R. To this are added the interfering voltages, shown as separate generators V/L induced in both wires coming from the transmitting station. The arrows indicate that the interfering voltages are of same sense and phase, consequently the interfering current I*st*, flowing across the grounded capacitance, increases the current I*sch* in one wire by the same amount the current in the other wire is decreased simultaneously. It concerns the superimposition of a direct current and of an A.C. (interfering) current.

Figure 2:
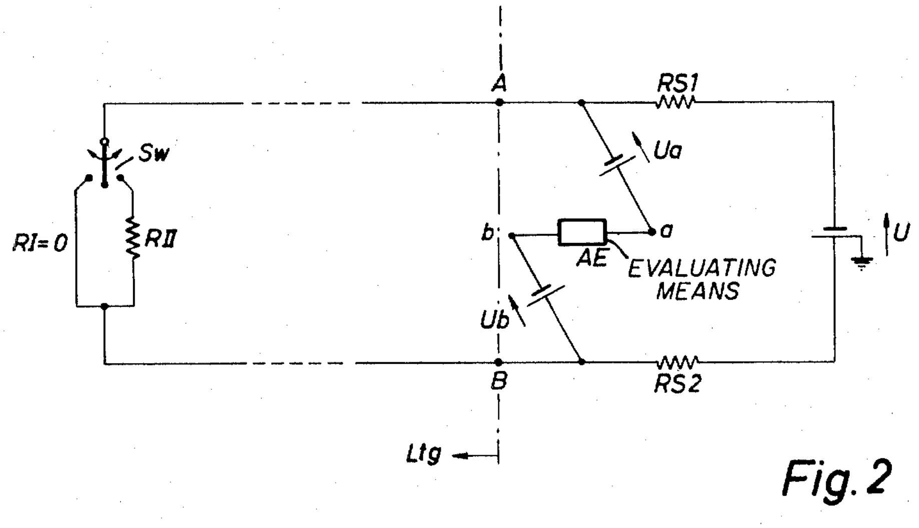
FIG. 2 shows the loop with the circuit arrangement to supervise said loop.

FIG. 2 shows an evaluating circuit, operated for example with two auxiliary voltage sources U*a* and U*b*, series-connected, whereby the evaluating device AE is connected between the two auxiliary voltage sources to the terminals *a* and *b*. The series-connection of U*a*, AE and U*b* is arranged in parallel to the line loop, connected to the terminals A and B. The feeder resistors RS1 and RS2 are inserted in both feeder lines from the supply source to the line loop terminals. The switch S*w* and the resistors RI, RII indicate that the loop resistance can vary between a value (on-hook) to a low value (off-hook). Potential difference means such as voltage source V*a*, V*b*, are shown between the device AE and the line terminal.

Figure 3:
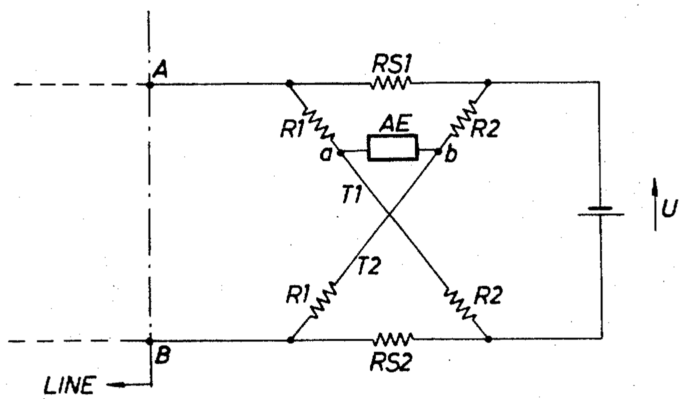
FIG. 3 shows the supervising circuit arangement, using voltage dividers.

FIG. 3 shows the evaluating circuit in which the evaluating device AE is connected at the tappings *a* and *b* between the potential difference means, such as resistors R1 and R2 of the voltage dividers T1 and T2. The voltage dividers are connected directly with the supply source via their resistors R2 and with the line terminals A and B via their resistors R1.

For the circuit arrangements shown in FIGS. 2 and 3 it can be proved with the aid of the Kirchhoff's laws (Kirchhoff's second law) that the potentials $\varphi a$ and $\varphi b$ at the points *a* and *b* are influenced by the interfering voltages in the same way and that the effects of the interfering current cancel each other when forming the difference $\varphi a - \varphi b$. This cancellation effect is shown particularly in FIG. 4.

The threshold value I*o* of the loop current is shown in the current-voltage diagram (FIG. 4) for the circuit arrangement according to FIG. 2, and the normalised representation, for the circuit arrangement according to FIG. 3; the threshold value $1/Ro$ corresponds to I*o* in the normalised representation. $1/U$ is an imaginary value in its definition.

That means the loop resistance R*o* itself does not appear. For resistances larger than R*o*, i.e., I*sch* smaller than I*o*, $\varphi a$ is smaller than $\varphi b$ at the conditions indicated; for resistances smaller than R*o*, i.e., I*sch* higher than I*o*, $\varphi a$ is larger than $\varphi b$. For the loop termination indicated e.g., in FIG. 2, namely $RI=0$ the loop current reaching a maximum, under ideal conditions $Isch=U/RS$.

To represent the potential curve when applying the circuit arrangements according to FIGS. 2 and 3 to disselects the scale $1/U$, normalised to the feeder voltage.

Figure 4:
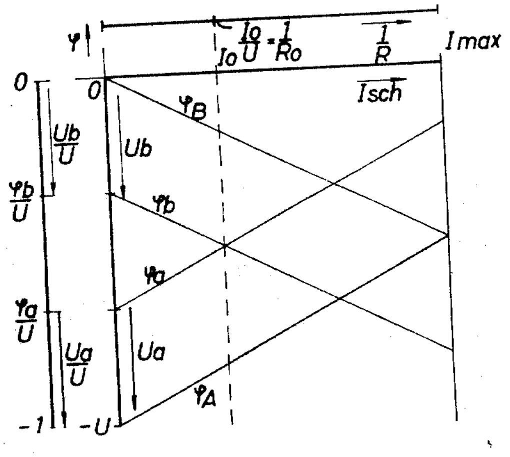
FIG. 4 shows the current-voltage diagram of the circuit arrangement according to FIG. 2, and in normalised representation according to FIG. 3, that is, the conductance versus voltage drop/E.M.F. diagram of FIG. 3.

Thus FIG. 4 shows that the circuit arrangement according to FIG. 3 offers particular advantages in case of feeder voltage fluctuations, since the fluctuations cancel out in the divider circuits.

Figure 5:
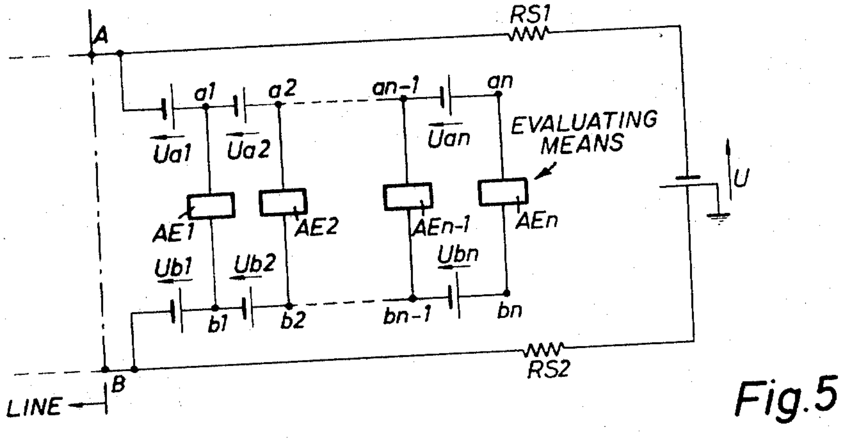
FIG. 5 shows the circuit arrangement to evaluate several ranges with the aid of auxiliary voltage sources.
Figure 6:
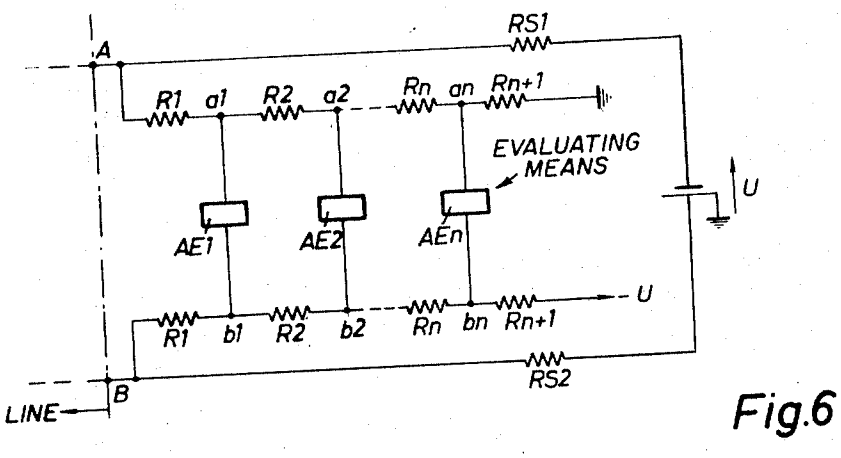
FIG. 6 shows the circuit arrangement to evaluate several ranges with the aid of voltage dividers.

The FIGS. 5 and 6 show the logical extension of the circuit arrangements according to FIGS. 2 and 3 to discriminate more than two current ranges of the loop current.

The two circuits will be used either if different line terminals in a loop are to be evaluated, or if a defined signal in a number of loops with different resistances is to be evaluated. Where the different resistances are, for example, the consequence of different loop lengths, then the threshold to which the device is to be set in the second case or to which tappings ($a_1, b_1 \ldots a_n, b_n$) the evaluating device must be connected is decided either by measuring at the moment of seizing, or by using information stored, that is characteristic for each loop.

To understand the circuit arrangement according to FIG. 6 the arithmetical derivation of the circuit arrangement according to FIG. 3 is useful. The result can be described with the aid of an equation $$\frac{\varphi a - \varphi b}{U} = \left(\frac{Ro}{Rx} - 1\right)(2k-1)$$

U represents the voltage of the supply source, R*o* is, as already mentioned, the imaginary threshold value of the loop resistance, R*x* is the actually existing total resistance of the loop; both R*o* and R*x* include the resistors RS1 and RS2; the factor *k* represents the divisional ratio of the voltage dividers T1 and T2.

With the aid of the factor *k* the magnitude of the auxiliary voltage sources and/or their sum voltage can also be determined for the circuit arrangement shown in FIGS. 2 and 5.

It can be gathered from the above equation that with the threshold value desired, for which applies $\varphi a - \varphi b = 0$, the divisional ratio *k* is determined at a defined threshold value R*o*.

Figure 7:
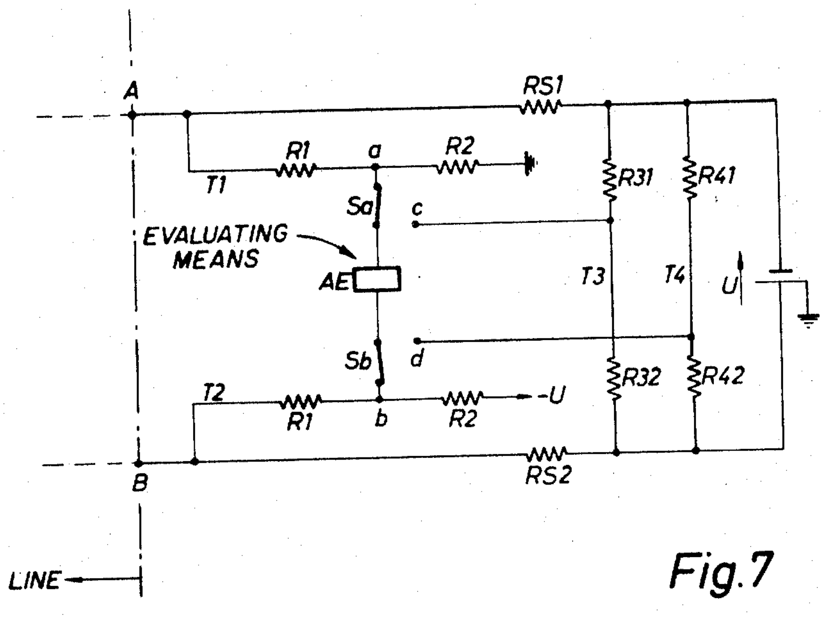
FIG. 7 shows the switchable evaluating circuit to recognize asymmetrical loads on the wires.

If also asymmetrical criteria are used in operating the line loop the evaluating device can selectively be associated to an individual wire through switching over with the aid of the switches S*a* and S*b*, as shown in FIG. 7. To evaluate a signal in the *a*-wire the switch S*b* is connected with contact *d*, for evaluating a signal on the *b*-wire the switch S*a* is connected with contact *c*. The contacts *c* and *d* are the tapping points of voltage dividers T3 and T4, serving to form a reference potential. Instead of the two voltage dividers T3 and T4, one voltage divider with three resistors, having a corresponding divisional ratio, can be selected, at which the reference potentials of the contacts *c* and *d* are tapped.

Figure 8:
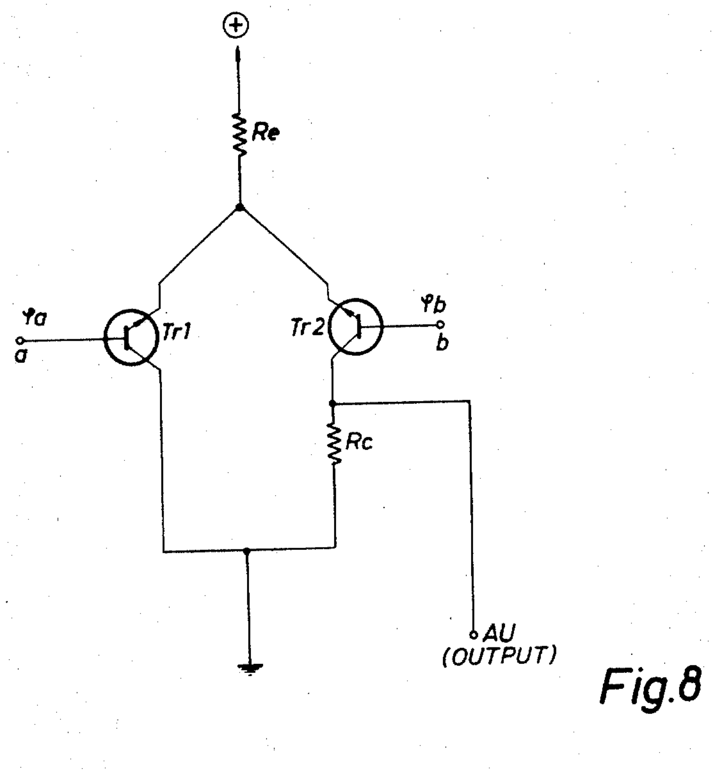
FIG. 8 shows the differential amplifier, used for evaluation.

FIG. 8 shows a differential amplifier used as an evaluating device. Depending on the different potentials $\varphi a$ and $\varphi b$, due to different loop resistances, at the bases of transistors T*r*1 and T*r*2 and the emitter bias applied through resistor RE, said transistors are either in the conductive or in the non-conductive condition. The output AU, connected in this example between the collector resistor R*c* and the collector of transistor T*r*2, receives different potentials, corresponding to the respective conditions of the transistors.

Figure 9:
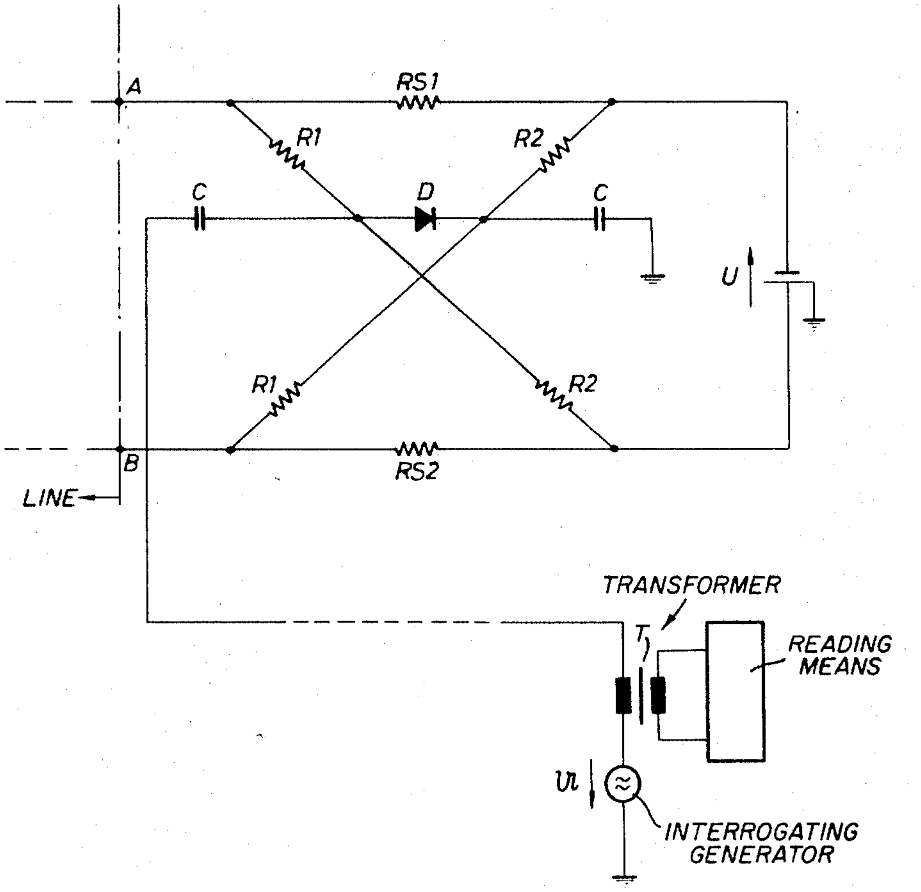
FIG. 9 shows the diode, used as evaluating means, in the A.C. circuit.

FIG. 9 shows an evaluating device using a diode which is scanned at timely intervals with alternating current or pulses. Capacitors C, are inserted in the A.C. circuit which prevent that a direct current flows in said circuit. The dynamic resistance of the diode changes, depending on whether the diode is biased in the conductive or in the blocking direction through the potential difference $\varphi a - \varphi b$. Thus, FIG. 9 shows a generator V*l* for applying an interrogating signal to diode D. The signal can be pulses or alternating current. The conduction through diode D is monitored by the scanning device or reading means.

Although I have shown a specific construction and assembly of the parts and features constituting my invention, I am fully cognizant of the fact that many changes may be made in the parts and their arrangement without effecting the operativeness of the device, and I reserve the rights to make such changes as I may deem necessary, or convenient without departing from the spirit or my invention, or the scope of the appended claims.

Having thus described my invention, what I claim and desire to secure by Letters Patent in the United States is:

1. Loop supervision circuitry for supervising the loop conditions and discerning loop resistances of telephone lines, particularly of telephone lines using direct current signalling, said loop including a pair of lines, a supply direct current voltage source at the receiving end of said loop, a first feeder resistor connected from the negative terminal of said supply voltage source to one line of said pair of lines, a second feeder resistor connected from the positive terminal of said supply voltage source to the other line of said pair of lines, said supervision circuitry comprising linear bridge means connected across said lines, said bridge means comprising a first voltage divider and a second voltage divider, each of said voltage dividers comprising a first and a second resistor serially connected, means for connecting the first resistor of the first voltage divider to the line side of the first feeder resistor, means for connecting the first resistor of said second voltage divider to the line side of said second feeder resistor, means for connecting the second resistor of said first voltage divider to the supply voltage source side of said second feeder resistor, means for connecting the second resistor of said second voltage divider to the supply voltage source side of said first feeder resistor, evaluating means operated to indicate whether the loop resistances are above or below a threshold value, said evaluating means connected between the junction points of said serially connected first and second resistors of each of said voltage dividers, and said first and second resistors of each of said voltage dividers having values selected so that at the threshold value of loop resistance of the bridge circuit is balanced at the connection points of said evaluating means.

2. A circuitry arrangement according to claim 1 wherein said two voltage dividers each comprise more than two serially connected resistors, a plurality of evaluating means, and one each of said plurality of evaluating means connected between said voltage dividers at the junctions of each of said resistors.

3. The circuitry of claim 1 including a third and a fourth voltage divider each comprising a first and a second voltage divider resistor, said third and fourth voltage divider each bridging said supply voltage source, and switch means for disconnecting said evaluating means from the connection between said first and second voltage divider and for connecting said evaluating means between said third and fourth voltage dividers at the junction points of said serially connected first and second resistors thereof.

4. The circuitry of claim 1 wherein said evaluating means comprises differential amplifier means, said differential amplifier means comprising a pair of NPN transistors, the base of each of said transistors being connected to the junction points of said serially connected voltage divider resistors, whereby the bases act as the inputs to said evaluating device, common emitter resistor means for biasing the emitters of said transistors, means for directly grounding the collector of a first of said pair of transistors, load resistor means connected between the collector of the second of said pair of transistors and ground, and output lead means extending from the connection point of said load resistor and said collector.

5. The circuitry of claim 1 wherein said evaluating means comprises a diode, interrogating means for determining when said diode is forward biased, first capacitor means connected between said interrogating means and one side of said diode, second capacitor means connected between the other side of said diode and ground, said interrogating means comprising interrogating voltage generating means, and reading means for determining when said diode is conducting.

References Cited

UNITED STATES PATENTS

| | | |
|---|---|---|
| 3,156,778 | 11/1964 | Cirone. |
| 3,129,289 | 4/1964 | Seeman. |
| 2,895,012 | 7/1959 | Liston et al. |
| 2,835,740 | 5/1958 | Heetman. |
| 2,823,263 | 2/1958 | Oberman. |

FOREIGN PATENTS

| | | |
|---|---|---|
| 1,112,755 | 8/1961 | Germany. |

KATHLEEN H. CLAFFY, Primary Examiner

T. W. BROWN, Assistant Examiner